(12) United States Patent
Benning et al.

(10) Patent No.: US 7,570,971 B2
(45) Date of Patent: Aug. 4, 2009

(54) ARRANGEMENT FOR THE WIRELESS CONNECTION OF TERMINALS TO A COMMUNICATION SYSTEM

(75) Inventors: Gerhard Benning, Unterschleissheim (DE); Josef Klein, Ascholding (DE)

(73) Assignee: Siemens Aktiengesellschaft, Munich (DE)

( * ) Notice: Subject to any disclaimer, the term of this patent is extended or adjusted under 35 U.S.C. 154(b) by 679 days.

(21) Appl. No.: 10/767,676

(22) Filed: Jan. 29, 2004

(65) Prior Publication Data

US 2004/0184418 A1    Sep. 23, 2004

Related U.S. Application Data

(63) Continuation of application No. PCT/DE02/02836, filed on Aug. 1, 2002.

(30) Foreign Application Priority Data

Aug. 28, 2001   (DE)   ................................. 101 42 007

(51) Int. Cl.
 *H04M 1/00* (2006.01)
 *H04B 7/00* (2006.01)
 *H04L 12/66* (2006.01)
 *H04L 12/28* (2006.01)

(52) U.S. Cl. ................... 455/552.1; 455/41.2; 370/352; 370/354; 370/356; 370/328; 370/401; 370/338; 370/466; 709/203; 709/227; 709/249; 709/246

(58) Field of Classification Search ................. 370/352, 370/338, 328, 401, 466; 455/552.1, 41.2; 709/203, 227, 249, 246

See application file for complete search history.

(56) References Cited

U.S. PATENT DOCUMENTS

| | | | | |
|---|---|---|---|---|
| 6,262,987 B1* | 7/2001 | Mogul | ......................... | 370/400 |
| 6,389,021 B1* | 5/2002 | Horikawa | ............... | 370/395.52 |
| 6,411,632 B2* | 6/2002 | Lindgren et al. | ............. | 370/466 |
| 6,496,484 B1* | 12/2002 | Suzuki | ........................ | 370/254 |
| 6,526,034 B1* | 2/2003 | Gorsuch | ...................... | 370/338 |
| 6,650,901 B1* | 11/2003 | Schuster et al. | ........... | 455/456.1 |
| 6,785,552 B2* | 8/2004 | Shinozaki et al. | ......... | 455/456.1 |
| 6,850,512 B1* | 2/2005 | Bishop et al. | ................ | 370/342 |
| 6,853,851 B1* | 2/2005 | Rautiola et al. | ........... | 455/553.1 |
| 6,870,830 B1* | 3/2005 | Schuster et al. | ............. | 370/352 |
| 6,958,988 B1* | 10/2005 | Okagawa et al. | ............ | 370/338 |

(Continued)

FOREIGN PATENT DOCUMENTS

DE        101 03 743 A1    8/2001

(Continued)

*Primary Examiner*—George Eng
*Assistant Examiner*—Christopher M Brandt

(57) ABSTRACT

The aim of the invention is to connect terminals to a communication system in a wireless manner by means of a data packet network. At least one transition device to which a short-range radio module is coupled, and a server for controlling connections to the terminals, are coupled to said data packet network. The transition device is provided with a coupling table comprising addresses of terminals which are situated within the radio coverage of the short-range radio module. The server comprises an allocation table in which a network address of the transition device which enables the terminal to be wirelessly reached is respectively allocated to an address of a terminal. According to the invention, a packet-based alignment protocol is provided in order to dynamically align the allocation table with the coupling table.

20 Claims, 1 Drawing Sheet

U.S. PATENT DOCUMENTS

| | | | |
|---|---|---|---|
| 6,965,584 B2* | 11/2005 | Agrawal et al. | 370/331 |
| 6,973,057 B1* | 12/2005 | Forslow | 370/328 |
| 7,035,270 B2* | 4/2006 | Moore et al. | 370/401 |
| 7,068,640 B2* | 6/2006 | Kakemizu et al. | 370/349 |
| 7,181,507 B1* | 2/2007 | Lavelle et al. | 709/220 |
| 7,188,175 B1* | 3/2007 | McKeeth | 709/227 |
| 2001/0030950 A1* | 10/2001 | Chen et al. | 370/329 |
| 2002/0009073 A1* | 1/2002 | Furukawa et al. | 370/352 |
| 2002/0059434 A1* | 5/2002 | Karaoguz et al. | 709/228 |
| 2002/0075844 A1* | 6/2002 | Hagen | 370/351 |
| 2003/0041175 A2* | 2/2003 | Singhal et al. | 709/249 |
| 2003/0095524 A1* | 5/2003 | Stephens et al. | 370/338 |
| 2005/0089052 A1* | 4/2005 | Chen et al. | 370/401 |
| 2006/0203804 A1* | 9/2006 | Whitmore et al. | 370/352 |

FOREIGN PATENT DOCUMENTS

| | | |
|---|---|---|
| EP | 0 758 187 A1 | 12/1997 |
| EP | 1 011 278 A2 | 6/2000 |
| EP | 1 085 774 A2 | 3/2001 |
| GB | 23366131 A * | 1/2000 |
| WO | WO 01/19053 A1 | 3/2001 |
| WO | WO 02/09458 A2 | 1/2002 |

* cited by examiner

ARRANGEMENT FOR THE WIRELESS CONNECTION OF TERMINALS TO A COMMUNICATION SYSTEM

CROSS REFERENCE TO RELATED APPLICATIONS

This application is a continuation of International Application No. PCT/DE02/02836, filed Aug. 1, 2002 and claims the benefit thereof. The International Application claims the benefits of German application No. 10142007.2 filed Aug. 28, 2001, both of the applications are incorporated by reference herein in their entirety.

FIELD OF INVENTION

The invention relates to an arrangement for the wireless connection of terminals to a communication system.

BACKGROUND OF THE INVENTION

With present communication systems, terminals that can serve a variety of purposes, such as the transmission of a voice, video, multimedia, fax, file, program and/or measuring data are increasingly coupled wirelessly. In the meanwhile, a variety of different radio network technologies such as GSM (Global System for Mobile Communication), DECT (Digital Enhanced Cordless Telephony), and particularly Bluetooth, have been developed from this for different fields of application. These radio network technologies differ particularly by the coverage of a particular radio link. The Bluetooth technology, which was standardized by IEEE by IEEE 802.15, in this case is used mainly for short-range wireless communication between different equipment or equipment components, such as between a telephone and headset. The range of a Bluetooth radio link is correspondingly short and extends from approximately 10 cm up to several meters.

Modern communication systems frequently provide a number of communication and data services in addition to a wealth of associated performance features. Up until now, however, the utilization of such a variety of communication and data services using a corresponding variety of wirelessly coupled terminals is possible to only a limited extent. Generally, a specific implementation is required for a specific communication or data application.

SUMMARY OF THE INVENTION

The object of this invention is to provide an arrangement for the wireless connection of terminals to a communication system by means of which a generic platform for the use of different communication and/or data services can be realized by wirelessly coupled terminals.

This object is achieved by an arrangement with the features of Claim 1.

The arrangement in accordance with the invention for the wireless connection of terminals to a communication system has a data packet network, such as a local area network (LAN) or a wide area network (WAN), to which at least one transition device with at least one coupled short-range radio module, and a server for controlling the connections to the terminals are coupled. The terminal device in this case can be terminal equipment, personal computers or application programs or client applications running on them, for voice, video, multimedia and/or data communication. The server can be realized in the data packet network, for example as a central unit or as a distributed application and/or integrated into a transition device.

The transition device has a coupling table with terminal device addresses of terminal devices in the radio range of at least one short-range radio module. Terminal device addresses in this connection can, for example, be telephone numbers, Internet protocol addresses, e-mail addresses or other URIs (Universal Resource Locators) of terminal devices.

The server has an allocation table in which a network address, valid in the data packet network, of the particular transition device is allocated in each case to one or more terminal device addresses, to which a short-range radio module, within whose radio range the terminal device identified by this terminal device address is located, is coupled. To dynamically align the allocation table with the coupling table, i.e. to make the content consistent with the coupling table, a packet-based alignment protocol is provided in accordance with the invention.

The coupling of the server and at least one transition device to the data packet network enables the flexibility and large application spectrum of packet-oriented communication networks to be advantageously utilized directly and generically for wireless applications. Because a corresponding packet-oriented communication infrastructure, e.g. in the form of local area networks (LAN) or wide area networks (WAN) is already present in, or being provided in, many places, the invention can generally be implemented at little cost. In particular, a number of the performance features, services and/or applications available in data packet networks of this kind can be used in a relatively simple manner. The arrangement in accordance with the invention thus provides a flexible, expandable, very scaleable, generic platform for using different communication and/or data services by means of wirelessly coupled terminal devices.

Using the allocation table, the server can appropriately forward incoming connection requirements for mobile terminal devices via the data packet network to the relevant transition device, the short-range radio module of which enables a relevant terminal device to be instantly, wirelessly reached. The packet-based alignment protocol enables roaming and/or handover of terminal devices to be controlled in a generic manner via the data packet network.

Advantageous embodiments and developments of the invention are given in the dependent claims.

In accordance with an advantageous embodiment of the invention, the data packet network can be realized by a network based on an Internet protocol. The advantage of this is that because of the worldwide spread of the Internet protocol an enormous variety of performance features, services and/or applications based on this protocol can be directly used.

The transition device can have a translator for translating between a network protocol used in the data packet network and the protocol specific to the radio module. In particular, the translator can translate between a connection setup protocol used in the data packet network and a connection setup protocol specific to the radio module.

Furthermore, the translator can have a detection device in order to detect, by means of the network protocol used, which application specific to the terminal device a connection to a terminal device is allocated to, so as to enable an application-specific translation to be accordingly performed.

Advantageously, the protocol specific to the radio module can have a specific voice interface and a specific data interface. The translator can therefore, for example, translate a Voice-over-Internet-Protocol (VoIP) used in the data packet network to the specific voice interface, and a data protocol, such as WAP (Wireless Access Protocol), HTTP (Hyper Test Transfer Protocol) or SMTP (Simple Mail Transfer Protocol) to the specific data interface.

Advantageously, a Bluetooth module can be used as the short-range radio module. Bluetooth modules of this kind have a small installation size, high data transmission rates, good cryptographic properties and high flexibility.

In accordance with an advantageous development of the invention, a locating device can be provided for determining the momentary location of a particular terminal device. The location can be determined by means of the allocation table, i.e. the transition device whose short-range radio module is located in the vicinity of the relevant terminal device can be determined by using the network address, stored within it, allocated to the terminal device address of the relevant network address. The location can be determined with greater accuracy the shorter the radio range of the relevant short-range radio module. In the case of a Bluetooth radio module the accuracy of location is within 10 cm to 10 meters.

In accordance with a further advantageous development of the invention, a gateway device coupled to the data packet network can be provided for coupling the data packet network to a forwarding communication network. The forwarding communication network can, for example, be a local area network (LAN), a wide area network (WAN), and ISDN (Integrated Services Digital Network) or a GSM (Global System for Mobile Communication) network.

In accordance with further advantageous embodiments of the invention, a wirelessly coupled headset for voice connection and/or a wirelessly coupled PDA (Personal Digital Assistant) for data connections can be provided as terminal devices. A PDA of this kind can also be used for voice connections, if a headset is connected to it. In particular, a PDA can be used as a terminal device for entering destination addresses, such as telephone numbers, Internet protocol addresses, mail addresses or other URIs for outgoing connections and for initiating these connections. Thus, for example, a voice connection can be initiated by a subscriber by entering the telephone number at a wirelessly coupled PDA, whereby the voice connection between an external terminal device identified by the telephone number entered and a headset of the subscriber, also wirelessly connected, is set up.

BRIEF DESCRIPTION OF THE DRAWING

An exemplary embodiment of the invention is described in more detail in the following with the aid of a drawing.

The drawing is a schematic representation of a communication system with wirelessly coupled terminal devices.

DETAILED DESCRIPTION OF INVENTION

Figure 1:
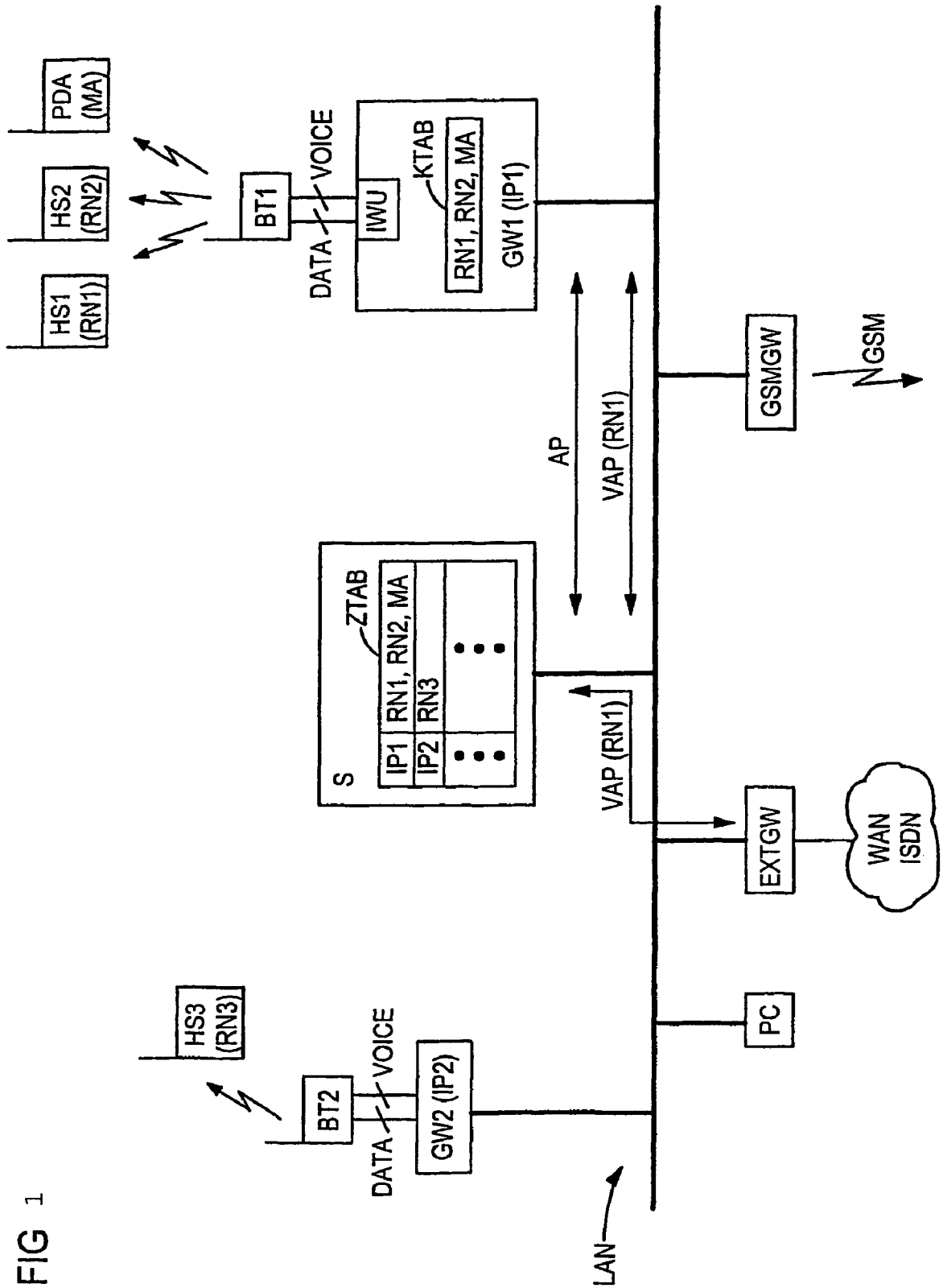

The drawing is a schematic illustration of a communication system with wirelessly coupled terminal devices that, in the exemplary embodiment shown, are arranged as headsets HS1, HS2, HS3 and PDA. The PDA in the illustration is given the same reference designation. The communication system includes a data packet network LAN, e.g. an Ethernet designed as a local network, the data transmission of which is preferably based on protocols of the TCP/IP family of protocols. Connected to the data packet network LAN is a server S, e.g. a gatekeeper in accordance with ITU-T recommendation H.323, that controls the connections carried in the data packet network LAN, e.g. for voice, video, multimedia and/or data communication and in particular a setup of such connections. This control preferably takes place by means of client-server structures based on Internet protocols. Connections to voice, video and/or multimedia communication via local networks based on Internet protocols are frequently designated VoIP (Voice/Video over Internet protocol) connections.

Gateways GW1 and GW2 are also coupled to the data packet network LAN as transition devices. In this case, an Internet protocol address IP1 is allocated to gateway GW1 and an Internet protocol IP2 to gateway GW2, in each case as a network address. The Internet protocol addresses IP1 and IP2, designated in the following as IP addresses, are valid at least within the network, i.e. within the data packet network LAN, and provide a unique identification of the particular allocated gateway GW1 or GW2 within the data packet network LAN.

Bluetooth transceiver modules BT1 and BT2, referred to in the following as Bluetooth modules, are coupled to gateways GW1 and GW2 as short-range radio modules. Bluetooth module BT1 is coupled to gateway GW1 and Bluetooth module BT2 to gateway GW2. Bluetooth modules BT1 and BT2 are preferably integrated into the relevant gateway GW1 or GW2. An exchange of control and useful data between a particular gateway GW1 or GW2 and the Bluetooth module BT1 or BT2 coupled to it takes place by means of a Bluetooth protocol specific to a radio module, with a specific voice interface VOICE and a specific data interface DATA.

In accordance with an alternative form, instead of one or more Bluetooth modules, other radio modules, e.g. in accordance with the DECT (Digital Enhanced Cordless Telephony) or GSM (Global System For Mobile Communications) standard are used, with specific voice, data, video and/or multimedia interfaces as appropriate.

For this exemplary embodiment let us assume that the headsets HS1 and HS2 and the PDA are momentarily in the radio range of the Bluetooth module BT1 and headset HS3 is momentarily in the radio range of Bluetooth module BT2. Headsets HS1, HS2 and HS3 and the PDA each have their own Bluetooth module (not illustrated) for wireless coupling to the particular opposite module BT1 or BT2. In addition to headsets HS1, HS2 and HS3 and the PDA, any other terminal devices such as a personal computer or an application program running on a PDA or client applications can also be wirelessly coupled.

A telephone number RN1 is allocated to headset HS1 and telephone number RN2 to headset HS2, a telephone number RN3 to headset HS3 and an e-mail address MA to the PDA. Telephone numbers RN1, RN2 and RN3 and the e-mail address MA are each network-overlapping valid terminal addresses, that in each case provide a network-overlapping, unique identification of an allocated terminal.

Furthermore, a personal computer PC, a gateway EXTGW coupled to a forwarding communication network WAN or ISDN and a gateway GSMGW leading to a GSM radio network are connected to the data packet network LAN. The terminal devices HS1 HS2, HS3 and PDA can be connected to public networks via gateways EXTGW and GSMGW. Gateways EXTGW and GSMGW are preferably formed as VoIP gateways in accordance with ITU-T recommendation H.323 and perform the relevant protocol translations. The forwarding communication network can, for example, be a wide area network WAN, e.g. the Internet, an ISDN network ISDN or other local network.

An IP address (not illustrated), that is at least valid internally within the network, by means of which these devices within the data packet network LAN can be identified, is allocated to the personal computer PC and gateways EXTGW and GSMGW in each case. In particular, the server S can be coupled to gateways GW1, GW2, EXTGW and GSMGW and to the personal computer PC by means of the Internet protocol. The server S in this case, as in this exemplary embodiment, can be realized as a central network device or, alternatively, realized in a gateway or a server application distributed in the data packet network LAN.

Gateway GW1 has a translator IWU, to which the Bluetooth module BT1 is coupled through the specific data interface DATA and the specific voice interface VOICE. The translator IWU performs a protocol translation between the Internet protocol used in the data packet network LAN and the Bluetooth protocol specific to the radio network. In particular, in this case a translation is made between a connection setup protocol VAP, e.g. in accordance with ITU-T recommendation H.323 and a Bluetooth connection setup protocol. In doing so, the translator IWU uses the network protocol used in the data packet network LAN or connection setup protocol VAP to determine which application, e.g. voice or data application, a particular connection is allocated to, and performs an application-specific protocol accordingly. In this exemplary embodiment, translation takes place to the voice interface VOICE or data interface DATA, depending on whether it is a voice or data application.

Gateway GW1 also has a coupling table KTAB in which the telephone numbers RN1, RN2 and e-mail address MA of the terminal devices momentarily present in the radio range of the Bluetooth module BT1, in this case HS1, HS2 and PDA, are stored. The coupling table KTAB is dynamically administered by the gateway GW1. As part of this, the terminal device addresses of the terminal devices that newly arrive in the radio range of the Bluetooth module BT1, or check in with it, are entered in the coupling table KTAB. Terminal device addresses are removed from the coupling table KTAB correspondingly if the relevant terminal devices leave the radio cell of the Bluetooth module BT1 or log off from it.

As for gateway BW1, gateway GW2 also has a corresponding translator and corresponding coupling table. For reasons of clarity, these functional components are not shown in the illustration for gateway GW2.

Furthermore, the server S contains an allocation table ZTAB in which the IP address IP1 or IP2 of those gateways GW1 or GW2 through which a terminal device identified by the particular terminal device address can be reached at that moment is allocated to the terminal devices addresses RN1, RN2, RN3 and MA. In this exemplary embodiment, IP address IP1 of gateway GW1 is allocated to terminal device addresses RN1, RN2 and MA and IP address IP2 of gateway GW2 is allocated to telephone number RN3, in the allocation table ZTAB.

The allocation table ZTAB is dynamically administered by server S, where it is continuously aligned with the coupling table KTAB so that the data content of both tables is consistent with each other.

The allocation table ZTAB is aligned with the coupling table KTAB by means of an alignment protocol AP based on an Internet protocol, that is performed via the data packet network LAN between the server S and gateway GW1. By means of the alignment protocol AP, a current data content of the coupling table KTAB is transmitted in each case via the data packet network LAN to the server S, to dynamically update the allocation table ZTAB. The alignment protocol AP is in this case preferably based on a client-server principle. In this example, the terminal device addresses RN1, RN2 and MA stored in the coupling table KTAB, together with IP address IP1 of gateway device GW1, are transmitted to the server S as part of the alignment protocol, and there they are allocated to each other and stored in the allocation table ZTAB. Immediately a further terminal device (not illustrated) is checked in with the Bluetooth module BT1, its terminal device address is stored in the coupling table KTAB and transmitted to the server S by means of the alignment protocol AP, where this terminal device address is allocated to the IP address IP1 of gateway GW1 and stored in the allocation table ZTAB. By means of the allocation table ZTAB, the server S can control roaming and/or handover of mobile terminal devices. The allocation table ZTAB thus acts as a roaming or handover table and is administered by the packet-based alignment protocol AP in a generic manner and not, as with prior art, in a manner specific to radio networks.

A corresponding alignment protocol (not shown for reasons of clarity) also runs between the server S and all other terminal devices, in this case G2, PC, EXTGW and GSMGW, for the data packet network LAN.

For this exemplary embodiment let us assume that as an operationally-typical situation a user is wearing the headset HS1 and also the PDA. Incoming calls through the headset HS1 are received by the user without a further aid. For outgoing calls, the user can use the PDA by entering a destination number to it and initiating the call. As part of the call, a connection is then set up between the called terminal and the headset HS1. Generally, wireless voice connections can be realized by means of the headset HS1 via the specific voice interface VOICE, and by means of the PDA wireless data connections, e.g. for the transmission of e-mails can be realized via the specific data interface DATA. If the PDA has its own connection for headsets, voice connections can also be set up via the PDA.

In this exemplary embodiment, the headset HS1 and the PDA are momentarily in the radio range of Bluetooth module BT1 and are checked in with it. Consequently, the telephone number RN1 of the headset HS1 and the e-mail address MA of the PDA are stored in the coupling table KPAB of gateway GW1.

In the following let us assume that a call for telephone number RN1 arrives from the forwarding communication network WAN or ISDN. The arrival of the call is transmitted by the gateway EXTGW, by means of an Internet protocol-based connection setup protocol VAP used in the data packet network LAN, e.g. in accordance with the ITU-T recommendation H.323, to the server S. The connection setup protocol VAP is preferable based on a client-server model. As part of the connection setup protocol VAP, the telephone number RN1 of the called terminal device HS1 is transmitted to the server S.

Using the connection setup protocol VAP, the server S first determines the application to which the connection to be set up is allocated. In this exemplary embodiment let us assume that this is a telephone application. The server S then searches the allocation table ZTAB for the received telephone number RN1, to determine whether the terminal device identified by it can be reached through the data packet network LAN controlled by server S, in order to determine the appropriate gateway. In this exemplary embodiment, the server determines that the telephone number RN1 is allocated to IP address IP1 of gateway GW1 and then, with the aid of the connection setup protocol VAP, switches the incoming call and telephone number RN1 through to gateway GW1 identified by IP address IP1. The connection setup and the necessary address resolution are thus performed by the server S using the allocation table ZTAB. If the terminal device HF1 enters the radio cell of a different Bluetooth module, e.g. BT2, the allocation table ZTAB is automatically updated with the aid of the alignment protocol AP, so that succeeding incoming connection requests, or already existing connections, are diverted to the relevant gateway, in this case GW2 (roaming or handover).

The call switched to gateway GW1 is allocated by gateway GW1 to headset HS1 by means of the received telephone number RN1 and put through to headset HS1 through the Bluetooth module BT1.

By means of the coupling of Bluetooth and Voice-over-IP-technologies in accordance with the invention, the various performance features and powerful infrastructure of Voice-Over-Internet Protocol networks, already widespread, can be used for the wireless connection of terminal devices of various kinds by means of Bluetooth modules.

The invention claimed is:

1. An arrangement for a wireless connection of terminal devices to a communication system, comprising:
   a data packet network for the transmission of data packets using network addresses valid within the network;
   a transition device coupled to the data packet network, the transition device comprises a short-range radio module and a coupling table, the short-range radio module locates a terminal device within range of the module, the coupling table includes an address of the located terminal device;
   a server coupled to the data packet network controls connections to the terminal device and controls roaming for the terminal device, the server includes an allocation table that comprises for each transition device: an aligned copy of the coupling table and a network address for the respective transition device such that the address of the located terminal device is associated with the copied table; and
   a packet-based alignment protocol for the dynamic alignment of the allocation table with the coupling table,
   wherein via the alignment protocol a content of the coupling table is transmitted to the server to dynamically update the allocation table thereby aligning the copy of the coupling table in the allocation table.

2. An arrangement in accordance with claim 1, wherein the data packet network is realized by a network based on an Internet protocol.

3. An arrangement in accordance with claim 1, wherein the transition device further comprises a translator for translation between a network protocol used in the data packet network and a protocol specific to the short-range radio module.

4. An arrangement in accordance with claim 3, wherein the translator further comprises a detection unit for detecting, via the network protocol used, which terminal device-specific application a connection to a terminal device is allocated to, in order to be able to perform an application-specific protocol conversion accordingly.

5. An arrangement in accordance with claim 3, wherein the protocol specific to a radio module having a specific voice interface and a specific data interface.

6. An arrangement in accordance with claim 1, wherein the short-range radio module is based on an IEEE 802.15.1 standard.

7. An arrangement in accordance with claim 1, wherein the allocation table is used for determining a momentary location of a particular terminal.

8. An arrangement in accordance with claim 1, wherein a gateway device is coupled to the data packet network for coupling the data packet network to a forwarding communication network.

9. An arrangement in accordance with claim 1, further comprising a headset as a terminal device for voice connections.

10. An arrangement in accordance with claim 1, further comprising a PDA (Personal Digital Assistant) as a terminal device for data connections.

11. An arrangement in accordance with claim 1, further comprising a PDA (Personal Digital Assistant) as a terminal device for entering destination addresses for outgoing connections and for initiating those connections.

12. An arrangement in accordance with claim 2, wherein the transition device comprises a translator for translation between a network protocol used in the data packet network and a protocol specific to a radio module.

13. An arrangement in accordance with claim 4, wherein the protocol specific to a radio module having a specific voice interface and a specific data interface.

14. An arrangement in accordance with claim 1, wherein the address of the detected terminal is a telephone number.

15. A method for a wireless connection of terminal devices to a communication system, comprising:
   detecting a terminal located within range of a short-range radio module integrated within a gateway;
   storing an address of the detected terminal in a coupling table of the gateway;
   providing a server having an allocation table containing addresses of terminals,
   transmitting a data content of the coupling table from the gateway to the server, and
   updating the allocation table in the server to associate an address in the allocation table with the address of the detected terminal stored in the coupling table of the gateway,
   wherein the transmission uses an alignment protocol for the purposes of aligning the coupling table and the allocation table, and
   wherein the allocation table is used for roaming, handover, or roaming and handover of the terminal device.

16. The method in accordance with claim 15, wherein the address of the detected terminal is a telephone number.

17. The method in accordance with claim 15, wherein the address of the detected terminal is an e-mail address.

18. The method in accordance with claim 15, wherein the address of the detected terminal is an universal resource locator.

19. The method in accordance with claim 15, wherein the address of the detected terminal is an Internet Protocol address.

20. The method in accordance with claim 15, wherein the address of the gateway is an Internet Protocol address.

* * * * *